United States Patent
Eimeke et al.

(10) Patent No.: US 11,148,337 B2
(45) Date of Patent: Oct. 19, 2021

(54) HOT RUNNER DEVICE HAVING AN OVERLOAD PROTECTION DEVICE

(71) Applicant: EWIKON HEISSKANALSYSTEME GMBH, Frankenberg (DE)

(72) Inventors: Stefan Eimeke, Frankenberg (DE); Peter Braun, Hungen (DE); Peter Mittler, Frankenberg (DE)

(73) Assignee: EWIKON HEISSKANALSYSTEME GMBH, Frankenberg (DE)

( * ) Notice: Subject to any disclaimer, the term of this patent is extended or adjusted under 35 U.S.C. 154(b) by 279 days.

(21) Appl. No.: 16/484,334

(22) PCT Filed: Feb. 21, 2018

(86) PCT No.: PCT/EP2018/054248
§ 371 (c)(1),
(2) Date: Aug. 7, 2019

(87) PCT Pub. No.: WO2018/153901
PCT Pub. Date: Aug. 30, 2018

(65) Prior Publication Data
US 2019/0366611 A1 Dec. 5, 2019

(30) Foreign Application Priority Data
Feb. 27, 2017 (DE) .......................... 102017104000.5

(51) Int. Cl.
*B29C 45/84* (2006.01)
*B29C 45/17* (2006.01)
*B29C 45/28* (2006.01)

(52) U.S. Cl.
CPC .......... *B29C 45/84* (2013.01); *B29C 45/1775* (2013.01); *B29C 45/281* (2013.01); *B29K 2995/0072* (2013.01); *B29K 2995/0094* (2013.01)

(58) Field of Classification Search
CPC .... B29C 45/1775; B29C 45/281; B29C 45/84
See application file for complete search history.

(56) References Cited

U.S. PATENT DOCUMENTS

| | | | |
|---|---|---|---|
| 4,286,941 | A | 9/1981 | Gellert |
| 7,497,681 | B2 | 3/2009 | Gunther |

(Continued)

FOREIGN PATENT DOCUMENTS

| | | |
|---|---|---|
| CN | 2776837 | 5/2006 |
| DE | 2554501 | 8/1976 |
| DE | 3124958 | 2/1982 |

(Continued)

OTHER PUBLICATIONS

Search Report issued in App. No. PCT/EP2018/054248 (2018).

*Primary Examiner* — James Sanders
(74) *Attorney, Agent, or Firm* — Barnes & Thornburg LLP (57) ABSTRACT

The invention relates to a hot runner device comprising at least one needle valve nozzle and a shut-off needle which is movable in the needle valve nozzle by means of a movement means, and comprising an overload protection device for the shut-off needle, characterized in that the overload protection device is implemented as follows: the shut-off needle is connected in at least a first movement direction directly or indirectly to the movement means by at least one frictional connection that can be released when a threshold force is exceeded.

16 Claims, 7 Drawing Sheets

(56) References Cited

U.S. PATENT DOCUMENTS

2010/0044896 A1    2/2010   Tabassi et al.
2011/0086121 A1    4/2011   Bouti et al.

FOREIGN PATENT DOCUMENTS

| DE | 19956215 | 6/2001 |
|---|---|---|
| DE | 20302845 U1 | 5/2003 |
| DE | 102013006257 | 11/2013 |
| DE | 102015216059 | 12/2015 |

HOT RUNNER DEVICE HAVING AN OVERLOAD PROTECTION DEVICE

CROSS-REFERENCE TO RELATED APPLICATIONS

This application is a U.S. nationalization under 35 U.S.C. § 371 of International Application No. PCT/EP2018/054248, filed Feb. 21, 2018, which claims priority to German Patent Application No. 102017104000.5, filed Feb. 27, 2017. The disclosures set forth in the referenced applications are incorporated herein by reference in their entireties.

The present disclosure is directed to a hot runner device with an overload protection device for a shut-off needle.

It is known to provide hot runner devices with an overload protection device having a positive connection or a fracture mechanism, which automatically suspends the movable shut-off needle in the hot runner during the closing movement under overload from the power flow of a drive device to avoid damage to the shut-off needle. However, the known overload protection devices are structurally designed in a relatively complex manner and yet offer only limited functional reliability. Reference is made, for example, to DE 10 2015 216 059 A1 concerning known overload protection devices, which shows positive engagement in the manner of a coupling with radially movable ball bodies as overload protection device, wherein a relatively long travel of the shut-off needle must be covered in order to trigger or activate this overload protection device. If the shut-off needle is blocked during opening or closing and the distance is not sufficient to trigger the overload protection device, the shut-off needle may be damaged or be moved without notice to an inadmissible position.

The present disclosure is directed to a hot runner device with a simply designed and reliable overload protection device.

A hot runner device according to the present disclosure has at least one needle valve nozzle and a shut-off needle which is movable in the needle valve nozzle by a needle mover (preferably in one direction back and forth), and an overload protection device for the shut-off needle, wherein the overload protection device is realized as follows: the shut-off needle is connected in at least one first direction of movement directly or indirectly to the needle mover by a frictional connection which is releasable when exceeding a limit force.

The protective mechanism for overload protection may take place exclusively via a frictional connection and not via a positive connection or a fracture mechanism, as in the known solutions, since it has been found that the triggering limit force at which the overload protection device releases the shut-off needle is adjustable in a simple manner in a relatively precisely way via the frictional connection. In addition, a frictional connection can be realized with simple design means with only small spatial requirements. This will be explained in more detail below with reference to illustrative embodiments to which the invention is not to be limited. According to the present disclosure, the triggering limit force may approach zero.

In some embodiments, which can be combined, the frictional connection is realized either on the one hand as a shrink, stretch and/or stretch-shrink assembly, and/or on the other hand via self-locking.

In an embodiment, the overload protection device is based solely on a frictional principle, since in this way the triggering limit force is particularly well adjustable.

In an embodiment, only one single frictional connection is provided, which causes a release of the shut-off needle in only one single direction of movement when exceeding the triggering limit force, for example, when closing an outlet opening of the needle valve nozzle with the shut-off needle. However, it can also be provided that the shut-off needle is connected in two different—for example, opposite—directions of movement directly or indirectly to the needle mover by at least one frictional connection which is releasable upon exceeding a limit force in order to effectively protect the needle valve nozzle against damage during both opening movements and closing movements of the shut-off needle for opening or closing the outlet opening of the needle valve nozzle.

In an embodiment, one or both of the releasable frictional connections may be realized in each case as a releasable self-locking cone press-fit connection or through two detachable cone press-fit connections.

In an embodiment, the first releasable cone press-fit connection may be realized by an outer cone on the valve needle and corresponding inner cone in the needle mover or the abutment of the shut-off needle, in particular a pin, as the first friction partner, a sleeve with inner cone as the second friction partner and another sleeve in the needle mover.

In an embodiment, a second cone press-fit connection can be provided that is formed by an outer cone on a sleeve, which is penetrated by the shut-off needle, as the first friction partner, and an inner cone in the needle mover or in a further sleeve inserted into the needle mover as a second friction partner.

In an embodiment, the shut-off needle is exclusively linearly movable back and forth with the needle mover. It can also be provided that the shut-off needle is connected in and/or against this direction or these directions only frictionally engaged with the needle mover. In an embodiment, the frictional engagement can also be supplemented by a positive connection, for example by a small circumferential groove in the one part (shut-off needle or needle mover) which engages in a corresponding circumferential groove of the other part (needle mover or shut-off needle) by way of latching. In an embodiment, the triggering force is substantially determined by the frictional engagement, i.e. it is determined by more than 50% by the frictional engagement.

It is provided in this case that one or both of the frictional and self-locking connections is/are realized in such a way that the shut-off needle or the abutment of the shut-off needle is connected in a frictionally engaged and self-locking manner to the needle mover such that the shut-off needle exceeds self-locking and automatically disengages at an axial force introduction which is greater than the static friction of the frictional connection.

In an embodiment, no axial displacement of the shut-off needle relative to the needle mover can take place before the overload is reached, since the frictional engagement is chosen such that it does not permit any elastic deformation upon release.

In an embodiment, the limit force is less than an expended mounting force (for pressing the shut-off needle into the needle mover). In addition, it is advantageous to set the level of the limit force depending on the level of the mounting force. Preferably, a setting of the limit force further takes place in a simple manner via the mounting force.

In an embodiment wherein the overload protection device is formed as a shrink assembly, the shrink assembly may be designed as a cylindrical shrink assembly in which, for example, a heated sleeve is shrunk onto a cylindrical portion, in particular onto a drive end, of the shut-off needle by cooling.

With regard to an embodiment wherein the overload protection device is a stretch assembly, it may be provided that the stretch assembly is formed as a cylindrical stretch assembly in which, for example, a cooled shut-off needle is expanded in a cylindrical portion, the sleeve or the receptacle by heating to ambient temperature.

In an embodiment, the shrink assembly and the stretch assembly may be combined to form a shrink-stretch assembly. The assemblies produced by heating and/or cooling are also called cross-press assemblies.

In an embodiment, the overload protection device may have a sensor which detects the triggering of the overload protection device and forwards a signal to a controller of the injection molding machine.

Generally, the protective mechanism for overload protection takes place via a frictional connection and not via a positive connection or a fracture mechanism, as in the known solutions, so that the triggering force is easily adjustable and the triggering takes place directly when the force is reached, without any deformation taking place or without having to cover any reaction path.

As far as terms such as above and below or right and left are used in the following, these relate to the position shown in the respective drawings. The installation position may deviate from this, so that the terms are to be understood in a relative way.

Figure 1A:
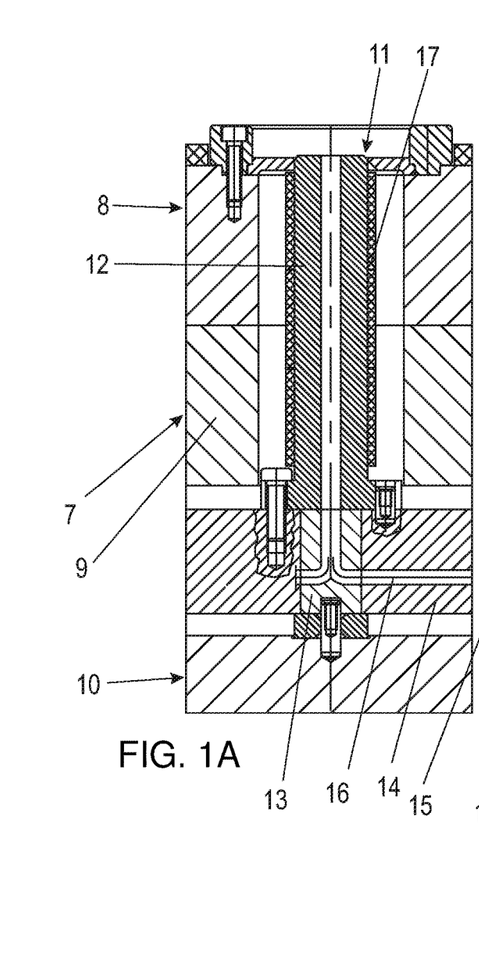
FIGS. 1A-1D each show a section through a portion of a hot runner device; wherein the figure parts 1A, 1B and 1D on the one hand and FIGS. 1A, 1C and 1D on the other hand represent two different operating states of the hot runner device in each case in an imaginary juxtaposed state.
Figures 1B, 1C:
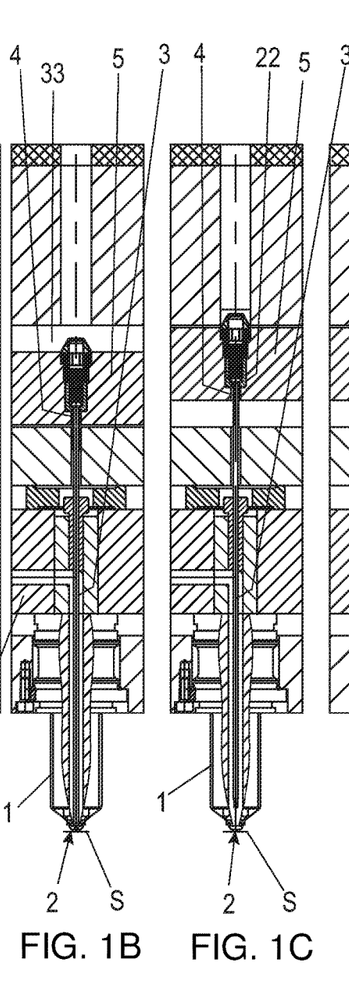
Figure 1D:
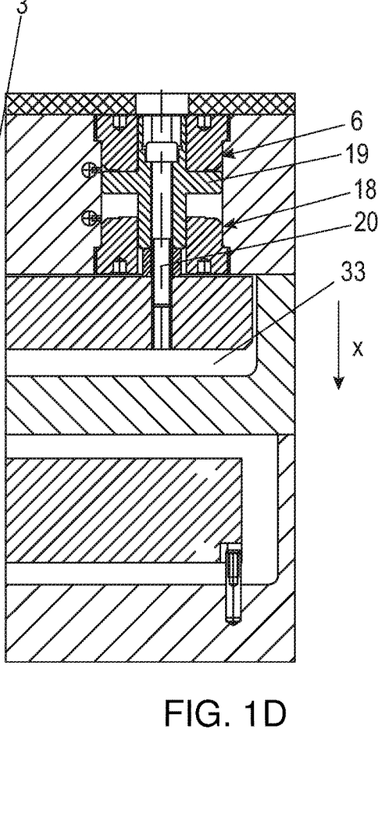

FIG. 1 shows in the interaction of parts A, B and D or A, C and D a respective sectional view of a portion of a hot runner device with a needle valve nozzle 1. This device is designed for injection-molding plastic components. The plastic component is injection-molded in a mold, which is here indicated only by a line S as a mold plate with opening and is otherwise not shown (see, for example, DE 10 201 521 6 059 A1), which usually has a mold plate having a gate bore.

FIGS. 1A-1D is divided here for the sake of simplicity into four parts which are arranged from each other spaced apart, wherein the parts A, B and D, in an imaginary juxtaposed state, represent the hot runner device in a closed position and wherein the parts A, C and D, in an imaginary juxtaposed state, represent the hot runner device in an open state.

The outflow end of the needle valve nozzle 1, which is aligned towards the mold plate, can be closed in the closed position by a closure end 2 of a shut-off needle 3, so that no more plastic can enter from the needle valve nozzle 1 or into the mold.

In FIG. 1B, the shut-off needle 3 has been moved accordingly in the direction of the mold (here in the downward direction), so that the needle valve nozzle 1 is closed. In contrast, in the open position of FIG. 10, the shut-off needle has been moved away from the mold (here in the upward direction), so that the needle valve nozzle 1 is opened. In this condition, plastic can flow into the mold.

The needle valve nozzle 1 and the shut-off needle 3 have a main extension direction X. The shut-off needle 3 is moved in a limited manner when closing and opening the needle valve 1 in and against the direction X relative thereto.

The shut-off needle 3 is held for this purpose at its—driven—end facing away from the free end 2 (hereinafter also called drive end) 4 in a needle mover of a lifting device. This needle mover may be formed as a lifting plate 5. The needle mover is movable by means of a drive device 6 in the direction X or is itself a part of the drive device (e.g. a piston).

The needle mover—here the lifting plate 5—is movable back and forth in a stroke volume 33 of a hot runner injection mold with multiple plates 8, 9, 10 in the X direction relative to these, wherein in and on these plates a hot runner section 11 with hot runner flow elements 12, 13, 14, 15 is formed. At the so-called distributor—flow element 15—the needle valve nozzle 1 is attached here.

The hot runner flow elements 12 to 15 and the needle valve nozzle 1 each have a channel section, wherein these channel sections in their interaction form a melt guide channel 16 which opens into an annular space around the shut-off needle 3 between the closure end 2 of the needle valve 1 and the drive end 4 of the shut-off needle and which extends to the open outlet end of the needle valve nozzle 1, so that by moving the shut-off needle 3 the melt flow into the mold plate (at S) can be released or closed. A gap is formed between the hot runner elements 12, 13, 14, 15 and the rest of the tool 7 to separate the hot or warm area from a region which is relatively colder in relation thereto. In order for the plastic melt to remain flowable in the gate system, it can be designed in any case to be heatable in sections (see the heater 17).

The movement of the shut-off needle 3 can take place, for example, with the aid of a fluid-actuatable drive cylinder 18 as a drive device 6, which has a movable piston 19 with a piston rod 20 which is directly or indirectly (i.e. via intermediately connected means) fastened to the needle mover—here the lifting plate 5. The drive device can also be realized differently, for example as an electric motor or electromagnet or as a hydraulic cylinder. It is also conceivable that the piston 19 itself forms the needle mover, to which the shut-off needle 3 is releasably attached.

It is readily possible to also attach a plurality of the shut-off needles 3 to the lifting plate 5 and still move the lifting plate 5 with only one drive device.

The shut-off needle 3 shown here is detachably fastened with its drive end 4 via an overload protection device, which is designed here as a (first) frictional connection or as a frictional connection 21 (see also FIGS. 2A-2B), in or on the needle mover, here the lifting plate 5. It is provided in particular that the overload protection device is realized as follows: the shut-off needle 3 is connected in at least one first direction of movement directly or indirectly to the needle mover, in particular a lifting means, via at least one frictional connection 21 which is releasable when exceeding a limit force. In this case, the frictional connection 21 is formed here according to an advantageous variant as a self-locking connection.

For this purpose, the at least one frictional connection 21 is designed such that the shut-off needle is held securely and firmly in the needle mover in normal operation during the reciprocation of the needle mover for opening and closing the needle valve nozzle 1. Only in an overload case at an excess of a limit force, the frictional force of the frictional connection 21 is overcome, so that the shut-off needle 3 and its end of movement 4 is released from its tight fit (e.g. formed by a pin 23, sleeve 24 and second sleeve 28) in the needle mover, here the lifting plate 5, so that the needle mover can move relative to the shut-off needle 3 in the X direction. Thus, the overload protection function/device is implemented with simple design means.

Hereinafter, various embodiments of an overload protection device according to the present disclosure are considered in more detail, to which the invention is not limited.

In an embodiment, the needle mover, in this case the lifting plate 5, are penetrated by a stepped bore 22, which may partially have a thread (FIGS. 1A to 5C). The drive end 4 of the shut-off needle 3 engages in this bore 22. In this case, a pin 23 is attached to the drive end 4 of the shut-off needle 3 in the axial extension of the same.

Figure 5A:
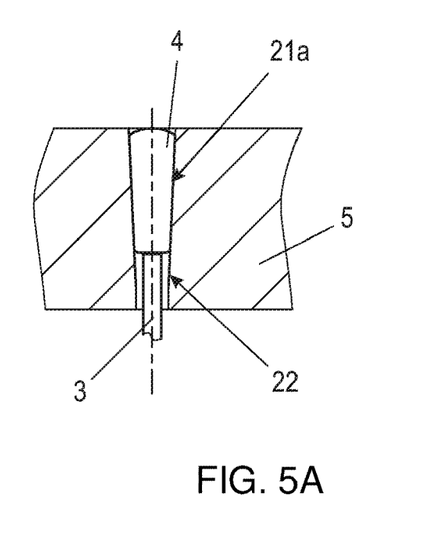
FIGS. 5A-5C show in 5A the components of another—structurally simple—embodiment according to the principle of FIG. 2, in 5B the components of another structurally very simple embodiment according to the principle of FIGS. 3 and 4, in which the head of the needle is formed conically, and in 5C the components of a structurally very simply constructed embodiment according to the principle of FIGS. 3 and 4, wherein the head of the needle is formed cylindrically and a conical pin forms the abutment of the needle.
Figure 5B:
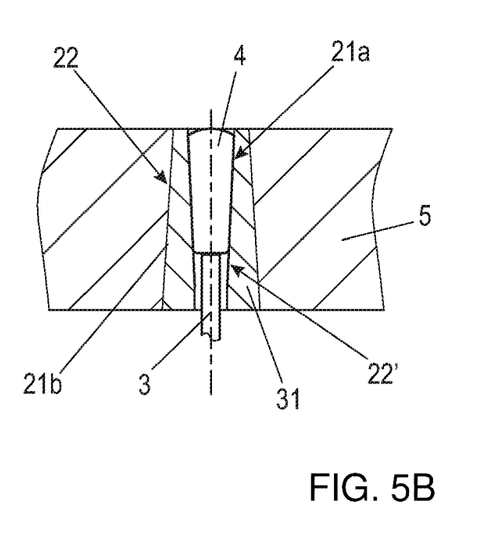

This pin 23 may alternatively—see FIGS. 5A and 5B, for example—also be integrally formed on the drive end 4 of the shut-off needle 3.

The pin 23 has a conical outer shape and is directly releasably held and fixed with frictional engagement in the conical bore 22'. For this purpose, the pin 23 is pressed during its assembly with a predetermined force into the bore 22'. The frictional connection 21 is thus formed here by the pin 23 with the outer cone A and the bore 22' with the at least partially provided inner cone I and the friction between pin 23 and bore 22' (see FIGS. 5A-5C and 6A-6B).

The bore 22' may be formed at least in sections in an inner conically corresponding manner to the conical shape of the pin 23 (see FIGS. 5A-5C and 6A-6B). Here the pin narrows from top to bottom, i.e. in the direction X, in which the shut-off needle 3 is moved in a closure movement into the position of FIG. 10.

Alternatively, the pin 23 can also be inserted directly into a bore 22 of the needle mover, in particular the lifting plate 5 (similar to FIG. 5A, not shown here in the drawing), or into a component inserted into the needle mover, in particular the lifting plate 5 (FIGS. 2A to 4B).

In an embodiment, this component may be a sleeve 24/31. The sleeve 24 is configured in a further preferred embodiment as a screw with an external thread, which is inserted into an internally threaded portion of the bore 22 and itself has an inner bore 22' which is concentric to the bore 22. The term "bore" is to be understood here and throughout this application in the sense of an opening, in particular a through-hole, which need not necessarily be made by drilling.

The needle mover 5 presses in this case via the pin 23 during the closing movement on the needle valve head 27 and the free end 4 of the shut-off needle 3 to move the shut-off needle 3 in an axially linear manner in the X direction.

Both the pin 23 and either the bore 22 in the needle mover or the bore 22', which is preferably concentric thereto, in the component, in particular the sleeve 24, respectively comprise a corresponding outer cone A and an inner cone I over their entire length in the X direction or at least in sections.

The pin 23 is or was pressed with a defined force during its assembly into the needle mover 5 or, in this case, into the sleeve 24 via its outer cone A into the inner cone I of the surrounding body—the sleeve 24 or directly the needle mover.

In an embodiment, it can be provided that the shut-off needle 3 has an outer cone A instead of a separate pin 23 directly at its one end and is thus directly frictionally connected to the needle mover 5 (or its sleeve 24). The shut-off needle 3 then has no separate pin, but forms this pin with its end itself. This embodiment is shown in FIG. 5A, which shows in A the components of an embodiment according to the principle of FIGS. 2A-2B, in which the bore 22 in the lifting plate 5 is formed in a directly conical manner and in which the drive end 4 of the shut-off needle 3 is formed in a corresponding manner conically as a pin.

Overall, the pin 23 is connected in a frictionally engaged and self-locking manner to the surrounding body—preferably the sleeve 24 or the mold plate 5—so that a translatory movement of the needle mover 5 moves the pin and thus the shut-off needle 3 in the direction X or in the opposite direction -X. In this way, the connecting needle 3 can be moved back and forth between the closed position (see, for example, FIG. 1B and the open position (see, for example, FIG. 1C).

During the closing movement, in which the needle mover—here the lifting plate 5—is moved in the direction -X, the closing needle 3 exerts an axial force on the pin 23 or on the frictional engagement region between the inner cone I and the outer cone A. If this axial force exceeds the static friction of the frictional connection, the pin 23 is released from the surrounding body—preferably the sleeve 24 or the lifting plate 5—and the shut-off needle 3 is no longer moved by the body or the drive device in the closing direction -X.

In other words, this means that the pin 23 triggers and no longer serves as an abutment for the shut-off needle 3. This can be seen, for example, in FIG. 2B. Here, the frictional connection 21 has released after moving the needle mover (this movement is not visible here) and the shut-off needle 3 was therefore able to move relative to the needle mover. Damage to the shut-off needle 3 can or could be avoided in this way.

As a result of a suitable adjustment of the mounting force, the limit force or critical force at which the pin 23 is to trigger can also be adjusted. In this way, the shut-off needle 3 is easily preserved from damage due to overload.

The needle mover can be configured differently. It can, for example, also directly be a piston or, for example, the previously described lifting plate 5. A lifting plate 5 is preferably—but not only—then chosen if one or more of the shut-off needles are to be installed in it.

Figure 2A:
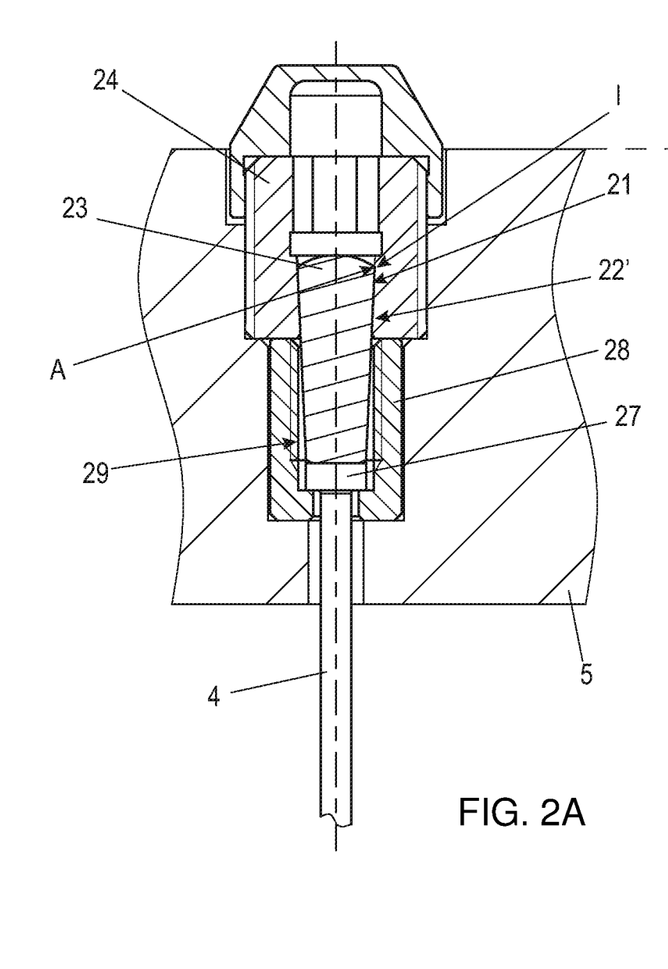
FIGS. 2A-2B show in 2A an enlarged sectional view of components of the hot runner device of FIG. 1B in an operating state without overload and in 2B the components of 2A after the occurrence of a first overload case.

Optionally, a cover cap 26 may be placed on the sleeve 24 at its end facing away from the shut-off needle 3 (FIG. 2A, which advantageously covers the bore 22 and prevents the released pin 23 from falling out into the stroke volume of the lifting plate.

In an embodiment, the shut-off needle 3 has a head 27 at its end 4 with a diameter which is widened in relation to the other diameter of the shut-off needle 3, with which it rests axially on the pin 23 and/or is fixed thereto, so that good power transmission between the pin 23 and the shut-off needle 3 may be provided, in particular if they are not formed integrally.

In an embodiment, a second sleeve 28 is inserted into the bore 22 below the sleeve 24. This further sleeve 28 may be fixed between a shoulder of the stepped bore 22 of the needle mover and the first sleeve 24—in particular as this sleeve 24 is formed as a screw. The second sleeve 28 preferably itself has a stepped inner bore 29. In this case, the head of the needle 27 is movably guided in the inner bore 29. In this case it strikes down against a collar of inner bore 29 so that it cannot escape from the inner bore 29. Usually, the dimensional adjustment is chosen so that the head of the needle 27 between the pin 23 and the collar of the stepped bore 29 has a slight play, so that the needle 3 can move transversely to the main movement direction X in order to avoid thermal stresses.

Figure 2B:
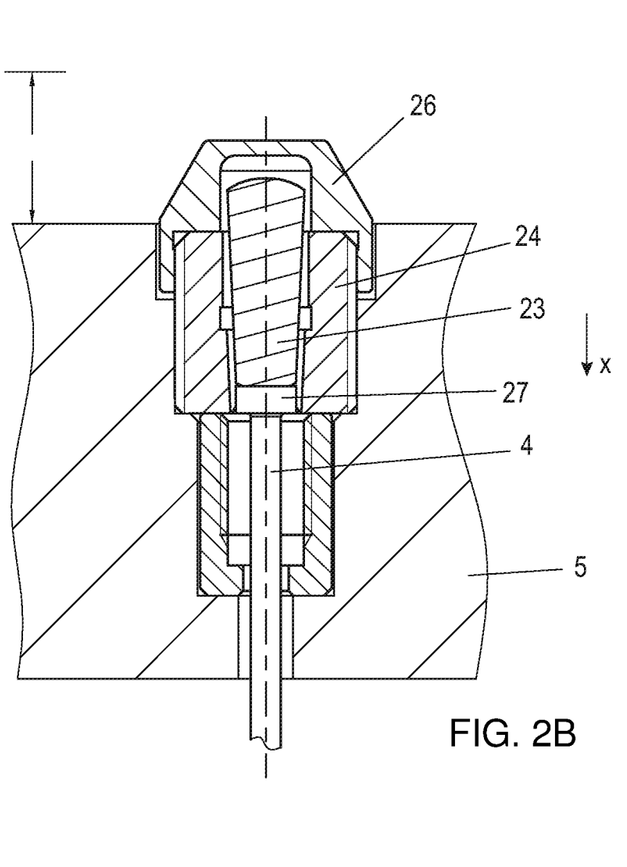
Figure 3A:
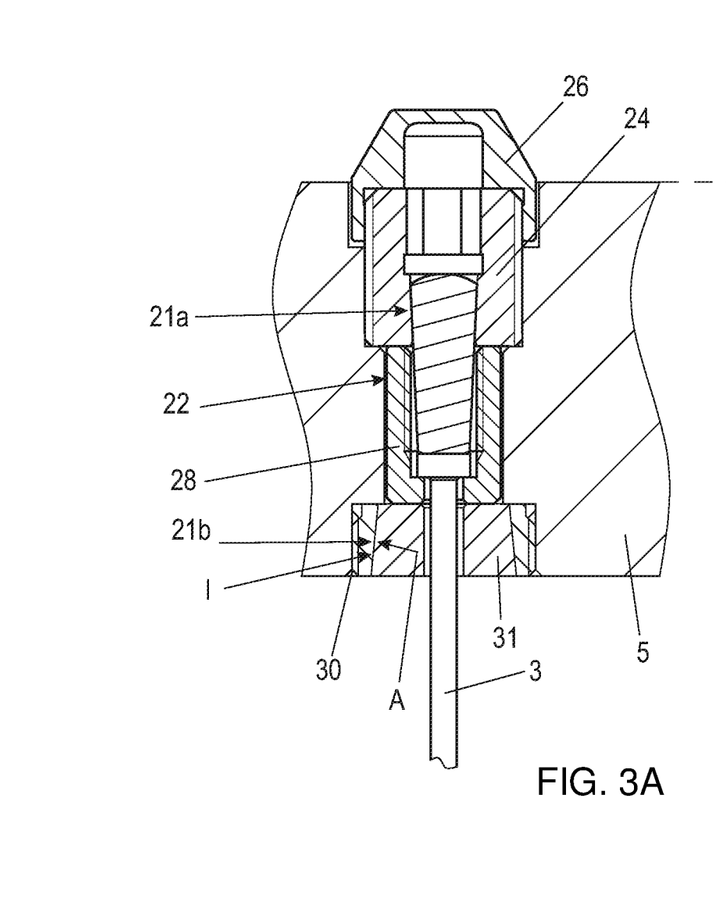
FIGS. 3A-3B show in 3A a sectional view of components of a first variant of a hot runner device in the type of FIG. 1) in a first operating state without overload and in 3B the components of 3A after the occurrence of a first overload case (overload during movement in the positive X direction)
Figure 3B:
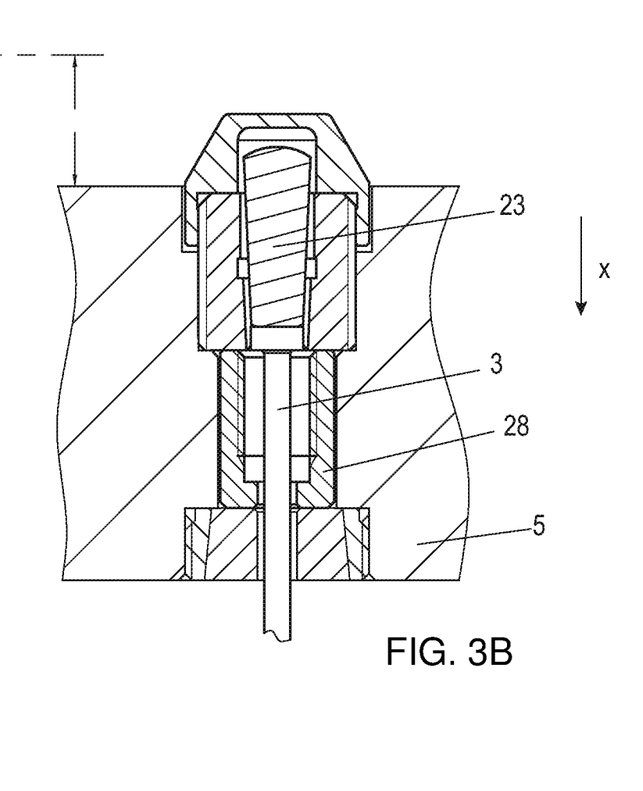

It is clearly shown in FIG. 2A that the pin 23 is pressed with its outer cone A into the inner cone of the sleeve 24. The shut-off needle 3 is moved upward (see also FIG. 10, which here corresponds to an open position on the needle valve nozzle 1. In FIG. 2B it can be seen that the shut-off needle 3 and the pin 23 have moved relative to the lifting plate 5 (lifting movement, it can be seen in each case from the offset of the lifting plate 5 between the FIGS. 2A and 2B of the respective stroke). The lifting plate 5 was moved in the downward direction. The shut-off needle 3 has not followed this movement because a disturbing force acts on it in an unrecognizable manner here, which is greater than the press-in force for mounting the pin 3 in the needle mover, in particular in the first sleeve 24. The pin 23 has been released from its press fit/friction fit and has not followed the movement of the needle mover.

The embodiment of FIGS. 3A-3B and 4A-4B differs from the embodiment of FIGS. 2A-2B in that the overload protection device is designed such that it can trigger in two directions +X and −X.

For this purpose, the overload protection device may have two (here locally separate) frictional engagement connections 21a and 21b.

Constructively, this can be achieved in various ways. According to the embodiment shown in FIGS. 3 and 4, a (here second) screw sleeve 30 is inserted into a lower portion of the bore 22, which is stepped in this case, in addition to the frictional connection 21a. This screw sleeve 30 is mounted on the side of the lifting plate 5 which is opposite the first sleeve 24. The screw sleeve 30 has an inner cone I. An inner sleeve 31 is pressed into said core, which sleeve has an outer cone A. At the same time, this cone press-fit connection 21b tapers in the opposite direction (here in the direction −x) like the first cone press-fit connection 21a.

The shut-off needle 3 passes through the inner sleeve 31. This is in turn is designed here such that the second sleeve 28 rests upwardly on it. The pin 23 and/or the head 27 cannot fall out of the lower sleeve 28 downwardly or exit therefrom, since the diameter of at least one or both of these elements is greater than the inner diameter of the bore 32 of the inner sleeve 31.

Figure 4A:
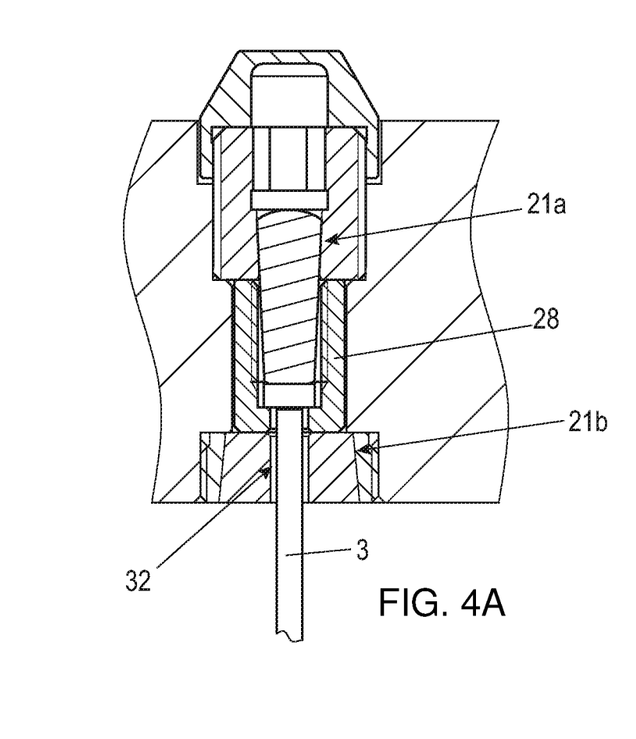
FIGS. 4A-4B show in 4A the components of the first variant of a hot runner device according to FIG. 3A in a second operating state without overload and in 4B the components of 4A after the occurrence of another overload case (overload when moving in the negative X direction) than in FIG. 3.

The function of the second frictional connection 21b as part of the overload protection device is as follows:

The shut-off needle 3 has been moved in FIG. 4A with the needle mover in the downward direction, which here corresponds to a closed position on the needle valve nozzle 1. If the shut-off needle 3 is now to be moved from the closed position to an open position, the head 27 bears against the lower annular collar of the second sleeve 28, so that the shut-off needle 3 is co-lifted by the movement of the needle mover together with the sleeves and pins 23, 24, 28, 30, 31, which are screwed and inserted therein.

Figure 4B:
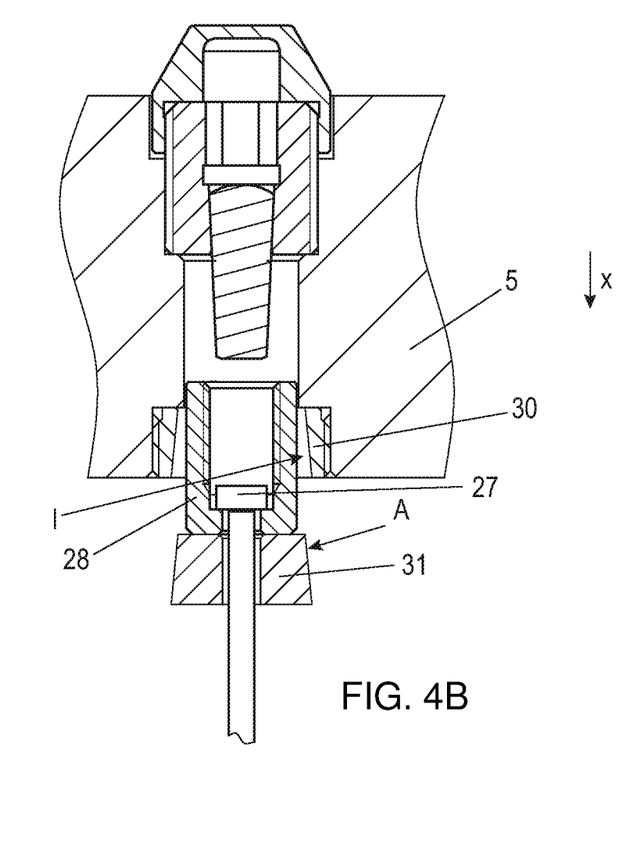

In FIG. 4B it can be seen that the shut-off needle 3 or the head 27, the second sleeve 28 and the inner sleeve 31 have moved relative to the lifting plate 5. The lifting plate 5 has been moved upwards. The shut-off needle 3 has not followed this movement since a disturbing force acts on it in a manner not recognizable here, which is greater than the pressing force for mounting the outer conical sleeve 31 in the needle mover, in particular in the screw sleeve 30. The inner sleeve 31, which is conical on the outside, has been released from its press fit/friction fit in the mounting means, particularly in the internally conical screw sleeve 30, and has not followed the movement of the needle mover.

Figure 5C:
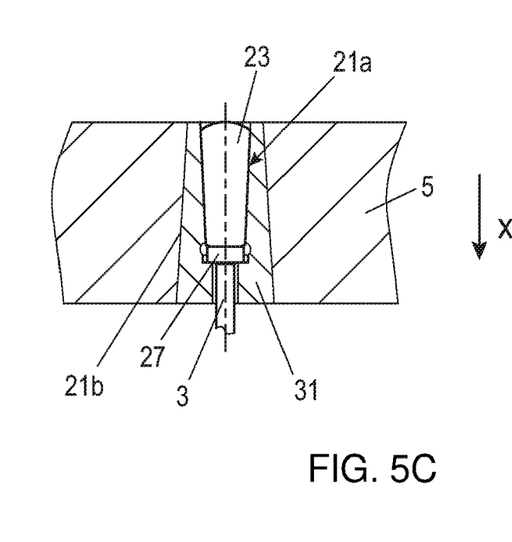

According to FIGS. 5B and 5C, two overload protection devices are also respectively realized as overload safeguards both during lifting and when lowering the shut-off needle 3 with two cone press-fit connections 21a, 21b, which act in different directions. However, the structural design is particularly simple, which is advantageous but not mandatory for the function of the invention.

Also according to FIGS. 5B and 5C, either the conical drive end 4 or a conical pin 23 is inserted into a sleeve 31 having a bore 22', which is formed correspondingly conical to the pin 23. In this way, in turn, a cone press-fit connection 21a is realized. The inner cone and the outer cone expand in a first direction "upwards" (direction −X). This corresponds to the first overload protection device according to FIG. 5A. The sleeve 31 thus corresponds here in each case also to the sleeve 24 of FIGS. 2A to 4B.

In addition, however, the outer contour of the sleeve 31 and the inner contour of the bore 22 in the lifting plate 5 are designed correspondingly conical. The inner cone and outer cone expand in a second direction "down" (direction X). According to FIGS. 5B and 5C, the bore 22 thus conically widens in the lifting plate downwards in the direction X, so that the sleeve 31 can be released under overload from its friction fit in FIG. 5B in the downward direction. This is the respective second overload protection device.

According to FIG. 5B, the drive end 4 of the shut-off needle 3 is integrally formed in a conical manner and thus forms the pin 23 per se. According to FIG. 5C, however, a pin 23 is placed on the drive end 4 (which in turn is formed here as a cylindrical head 27).

These embodiments are structurally simple and still well functional.

As a result of the two friction connections according to FIGS. 3A to 5C, the overload protection device can be reliably triggered in each case in both possible directions of movement of the needle valve nozzle.

In the following, the mode of operation of an overload protection device will be described in more detail again with reference to FIGS. 6A-6B and 7, which shows a constructively simplified but nevertheless theoretically functional design.

Figure 6A:
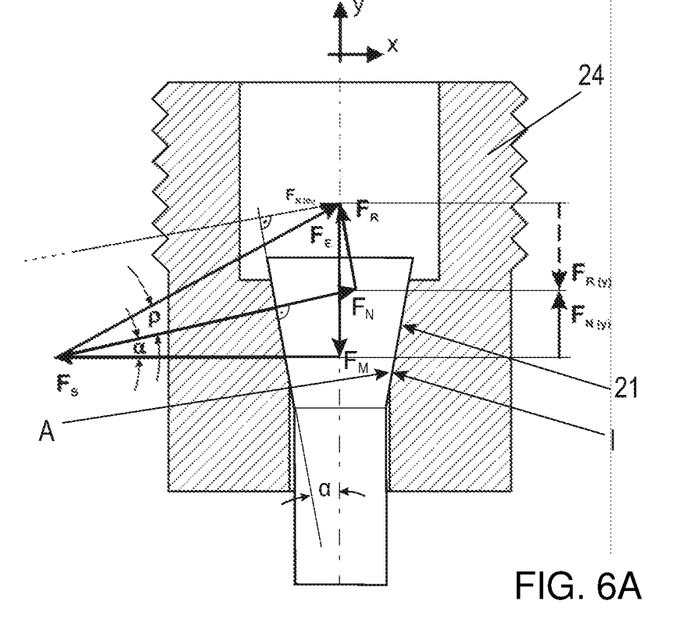
FIGS. 6A-6B show in 6A a simplified sectional view of a variant of a hot runner device of the type of FIG. 1) in the assembled state of self-locking components with force vectors and angle entries to illustrate the effective mounting forces, and in 6B the components of 6A after the occurrence of a first overload case with the force vectors and angle entries to illustrate the acting forces.

During its initial mounting, the conical pin 23 is pressed by means of a suitable device (not visible here) with a force $F_M$—see FIG. 6A—into the conical bore 22' of the sleeve 24. Consequently, a normal force FN is built up via the flanks (flank angle α) of the cone of the conical frictional connection. The friction (coefficient of friction μ=tanρ) acts against the mounting force $F_M$ and generates the frictional force $F_R$. Thus, the theoretically achievable normal force $F_{N(th)}$ is reduced and the x-component of the resultant force FE is reduced to the remaining spreading force $F_S$. As long as the y component $F_{N(y)}$ of the normal force $F_N$ is smaller than the y-component $F_{R(y)}$ of the frictional force $F_R$, there is self-locking and the conical pin can be pushed out again only with a release force $F_L$ (see FIG. 6B).

Figure 7:
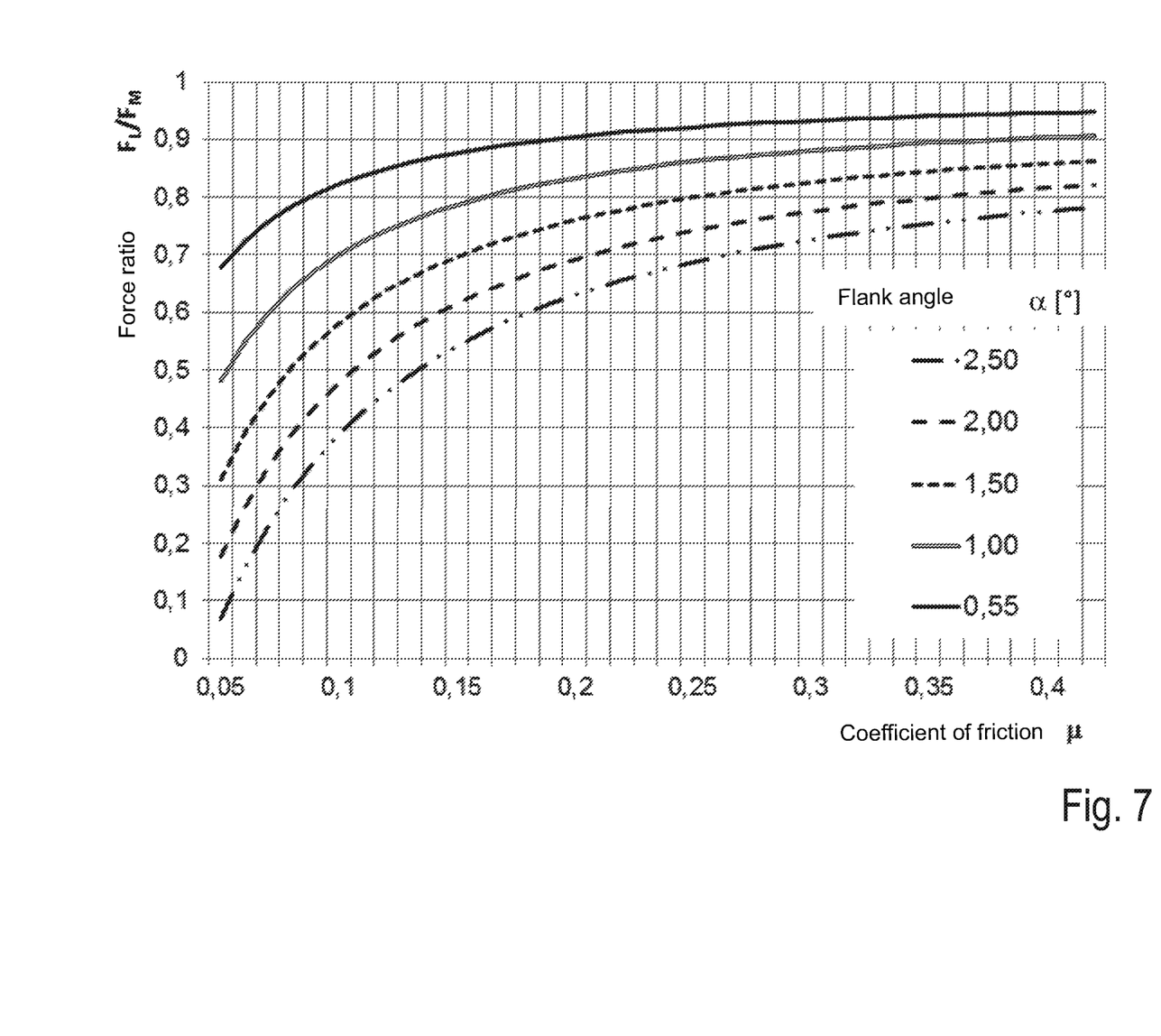
FIG. 7 shows a diagram of the force ratio between release force/mounting force of the self-locking cone connection according to FIGS. 2A-5C as a function of the coefficient of friction $\mu$ and with the flank angle $\alpha$ of the cones as parameters, wherein the constructive embodiment in FIGS. 6A-6B is shown in simplified form.

The force diagram of FIG. 7 shows that self-locking is present for:

ρ≥α.

Figure 6B:
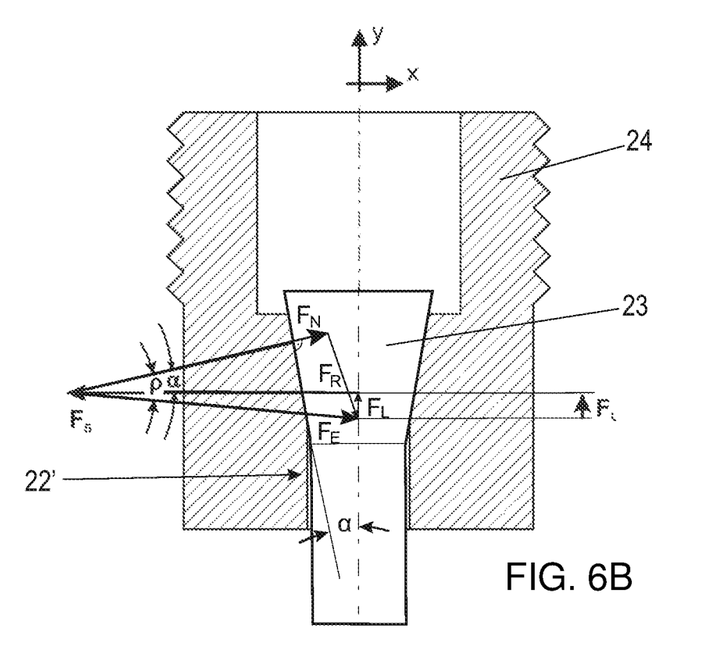

The force relationships during a disassembly process are illustrated in FIG. 6B. The exact release force $F_L$ can be seen in FIG. 7. For this, it must be noted that when the mounting force $F_M$ is removed, the direction of the frictional force $F_R$ is reversed and thus the normal force $F_N$, with the same spreading force $F_S$, becomes smaller because the x-component of the frictional force $F_{R(x)}$ now counteracts the spreading force $F_S$. The necessary release force $F_L$ is mainly determined by the mounting force $F_M$ and, as the force diagrams show, depends on both the flank angle α and the coefficient of friction μ=tanρ.

How the factors affect the release force (qualitatively) is shown in FIG. 7. The following applies:

$$\frac{F_L}{F_M} = \frac{\tan(\rho - \alpha)}{\tan(\rho + \alpha)}, \rho = \arctan(\mu)$$

The invention claimed is:

1. A hot runner device comprising at least one needle valve nozzle, a shut-off needle movable in the needle valve nozzle, a needle mover operable to move the shut-off needle, and an overload protection device for the shut-off needle, wherein the overload protection device comprises a direct or indirect frictional engagement between the shut-off needle and the needle mover, wherein the frictional connection is releasable in at least one first direction of movement when a first limit force is exceeded.

2. The hot runner device according to claim 1, wherein the frictional connection is a self-locking connection.

3. The hot runner device according to claim 1, wherein the frictional connection is a cross-press assembly.

4. The hot runner device according to claim 1, wherein the overload protection device consists of the frictional connection.

5. The hot runner device according to claim 1, wherein the overload protection device comprises the shut-off needle further is directly or indirectly connected to the needle mover by a second frictional connection, wherein the second frictional connection is releasable when a second limit force is exceeded.

6. The hot runner device according to claim 1, wherein at least one of the frictional connections is a releasable self-locking cone press-fit connection.

7. The hot runner device according to claim 6, wherein the releasable cone press-fit connection comprises an outer cone on the shut-off needle or a pin on the abutment of the shut-off needle, as the first friction partner, and an inner cone in a bore in the needle mover or in a sleeve inserted into the needle mover.

8. The hot runner device according to claim 7, wherein a second of the frictional connections comprises a second releasable cone press-fit connection comprising an outer cone on a sleeve penetrated by the shut-off needle and an inner cone in the needle mover or in a further sleeve inserted into the needle mover.

9. The hot runner device according to claim 1, wherein the shut-off needle is movable only linearly in a reciprocating manner with the needle mover in a linear direction, and wherein the shut-off needle is only frictionally connected to the needle mover in or against the linear direction (X).

10. The hot runner device according to claim 1, wherein the needle mover comprises a lifting plate movable by a drive device.

11. The hot runner device according to claim 1, wherein at least one of the frictional and self-locking connections is configured such that the shut-off needle or the abutment of the shut-off needle is connected to the needle mover in a frictionally engaged and self-locking manner such that the shut-off needle automatically disengages from the needle mover in response to an axial force greater than the static friction of the frictional connection.

12. The hot runner device according to claim 1, wherein the shut-off needle is not displaced with respect to the needle mover at a force less than the first limit force.

13. The hot runner device according to claim 1, wherein the frictional connection is a cylindrical shrink connection.

14. The hot runner device according to claim 2, wherein the limit force is lower than an expended mounting force.

15. The hot runner device according to claim 14, wherein the limit force is dependent on the level of the mounting force, and the adjustment of the limit force takes place via the mounting force.

16. The hot runner device according to claim 3, wherein the cross-press assembly is formed as one of a shrink, a stretch, and a stretch-shrink assembly.

* * * * *